(12) United States Patent
Hahn et al.

(10) Patent No.: US 12,486,895 B2
(45) Date of Patent: Dec. 2, 2025

(54) ACTUATOR HAVING A SENSOR DEVICE FOR SENSING ANGULAR POSITIONS OF A ROTATING COMPONENT, AND ELECTRIC DRIVE SYSTEM HAVING AN ACTUATOR OF THIS TYPE

(71) Applicant: ZF FRIEDRICHSHAFEN AG, Friedrichshafen (DE)

(72) Inventors: Stephan Hahn, Bundorf (DE); Christopher Böhm, Bamberg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 199 days.

(21) Appl. No.: 18/280,087

(22) PCT Filed: Mar. 7, 2022

(86) PCT No.: PCT/EP2022/055705
§ 371 (c)(1),
(2) Date: Sep. 1, 2023

(87) PCT Pub. No.: WO2022/189334
PCT Pub. Date: Sep. 15, 2022

(65) Prior Publication Data
US 2024/0141988 A1    May 2, 2024

(30) Foreign Application Priority Data

Mar. 10, 2021  (DE) .................... 10 2021 202 311.8

(51) Int. Cl.
*H02K 11/215*    (2016.01)
*F16H 59/40*    (2006.01)
(Continued)

(52) U.S. Cl.
CPC ............. *F16H 61/32* (2013.01); *F16H 59/40* (2013.01); *G01D 5/14* (2013.01); *H02K 11/215* (2016.01); *H02K 2211/03* (2013.01)

(58) Field of Classification Search
CPC .. H02K 11/215; H02K 2211/03; F16H 59/40; F16H 61/32
(Continued)

(56) References Cited

U.S. PATENT DOCUMENTS

| 10,890,253 B1 | 1/2021 | Probst et al. |
| 2002/0145220 A1 | 10/2002 | Yamashita et al. |
| 2010/0034688 A1 | 2/2010 | Nagata et al. |

FOREIGN PATENT DOCUMENTS

| DE | 102008043639 | 5/2010 |
| DE | 102015216980 | 3/2017 |

(Continued)

OTHER PUBLICATIONS

Office Action of corresponding German Patent Application No. DE 10 2021 202 311.8.

*Primary Examiner* — Jose A Gonzalez Quinones
(74) *Attorney, Agent, or Firm* — COZEN O'CONNOR

(57) ABSTRACT

An actuator for actuating a shift element in a transmission of a vehicle, particularly of a utility vehicle, includes a sensor device for detecting angular positions of a rotating component, for example, a shaft in an electric drive for a vehicle. The sensor device includes an annular encoder magnet fastened to a support pin supported on a front side of the rotating component so as to be fixed with respect to rotation relative to it such that the annular encoder magnet at least partially surrounds the support pin. The annular encode magnet is mounted on the support pin as a molded encoder magnet component.

11 Claims, 2 Drawing Sheets

(51) Int. Cl.
*F16H 61/32* (2006.01)
*G01D 5/14* (2006.01)

(58) Field of Classification Search
USPC ..................................................... 310/68 B
See application file for complete search history.

(56) References Cited

FOREIGN PATENT DOCUMENTS

| | | | | |
|---|---|---|---|---|
| DE | 102018112946 | | 12/2019 | |
| DE | 102019130831 | | 5/2021 | |
| DE | 102020213623 | A1 * | 5/2022 | |
| EP | 3431825 | | 1/2019 | |
| EP | 3431825 | A1 * | 1/2019 | ............. F16H 1/203 |
| JP | 09329609 | A * | 12/1997 | |

\* cited by examiner

ACTUATOR HAVING A SENSOR DEVICE FOR SENSING ANGULAR POSITIONS OF A ROTATING COMPONENT, AND ELECTRIC DRIVE SYSTEM HAVING AN ACTUATOR OF THIS TYPE

CROSS REFERENCE TO RELATED APPLICATIONS

This is a U.S. national stage of Application No. PCT/EP2022/055705 filed Mar. 7, 2022. Priority is claimed on German Application No. DE 10 2021 202 311.8 filed Mar. 10, 2021, the content of which is incorporated herein by reference.

BACKGROUND OF THE INVENTION

1. Field of the Invention

The present disclosure is directed to the field of electric vehicles and hybrid vehicles, particularly to an actuator with a sensor device for sensing angular positions of a rotating component in an at least partially electrified utility vehicle.

TECHNICAL BACKGROUND

The electrification of vehicles has become a central theme in the present day automobile industry. A power-operated electric drive rather than an internal combustion engine is used in an electric vehicle or a hybrid vehicle. Therefore, such electric vehicles and hybrid vehicles are driven not at all or only partially with conventional fossil fuels and clearly excel over gasoline vehicles and diesel vehicles when it comes to reduced emission of greenhouse gases. Further, gases such as nitrogen oxides that are environmentally harmful and detrimental to health are not released or, if so, only to a limited extent when driving with an electric vehicle or hybrid vehicle, which adds to the environmental friendliness of electric vehicles and hybrid vehicles.

The utility vehicle sector has also undergone electrification. Comparatively higher outputs are required in utility vehicles in order to drive the vehicle. Particularly at higher vehicle velocities and correspondingly high speeds, the torques generated by the electric motor are of limited use. Therefore, in electrified utility vehicles a transmission, such as a two-speed transmission, is often used to shift the speed of the electric motor. The transmission comprises a shift element which can be actuated by an actuator likewise provided in the electric drive. The actuator comprises a sensor device for detecting angular positions of a shaft in the electric drive, such as an output shaft of an actuating device. The position of a dog clutch can be calculated from the angular position of the output shaft for shifting gears. The angular position of the shaft is detected in that an encoder magnet is fastened as a signal encoder to the shaft so as to be fixed with respect to rotation relative to it, and the magnetic field generated by the encoder magnet is detected by a sensor unit such as a Hall sensor or a magnetoresistive sensor.

The commutation of the electric motor is derived based on the detected angular positions. Based on this, a control signal can be generated subsequently, by which the actuator actuates the shift element of the transmission in order to shift the speed of the electric machine.

These encoder magnets can be produced as loose individual parts and joined together with the rotating component to be detected when used in the sensor device. This joining is usually accomplished by adhesives in the sensor devices known from the prior art, resulting in an uneconomical production process.

SUMMARY OF THE INVENTION

It is an object of one aspect of the invention to join the encoder magnet to the rotating component so as to be fixed with respect to axial displacement and radial rotation while simultaneously minimizing production efforts and costs.

This object is met by an actuator and an electric drive according to one aspect of the invention.

The actuator serves to actuate a shift element of the transmission. A sensor device is installed in the actuator to detect the angular positions of a rotating component in a vehicle. The rotating component can comprise, for example, an output shaft, a motor shaft and/or a toothed shaft. The vehicle is preferably an electric vehicle or a hybrid vehicle. However, the subject matter of the invention is not limited thereto. On the contrary, the sensor device can be used in other areas. The electric drive is constructed as a traction drive and comprises an electric machine, preferably an electric motor. Further, the electric drive comprises a transmission, for example, a two-speed transmission, for changing the speed of the electric machine.

The sensor device comprises an annular encoder magnet for generating a magnetic field. The encoder magnet can be formed from a ferromagnetic material such as iron or nickel. The encoder magnet is fastened to a support pin, which is supported on a front side of the rotating component, preferably a shaft of the electric machine, so as to be fixed with respect to rotation relative to it. Accordingly, when the shaft rotates, the magnetic field of the encoder magnet rotates correspondingly. Therefore, the angular position of the shaft can be determined by sensing this magnetic field.

The encoder magnet is formed to be annular and is mounted at the support pin in such a way that it at least partially surrounds the support pin. The support pin passes through an annular opening of the annular encoder magnet. The support pin can be formed as a constituent part of the rotating component or of the shaft of the electric machine and, therefore, integral with the shaft. Alternatively, the support pin can be formed as a component part which is separate from the rotating component or shaft of the electric machine and can be made to communicate with the shaft on the front side thereof so as to be fixed with respect to rotation relative to it.

According to one aspect of the invention, the annular encoder magnet is produced in a molding process and is mounted on the support pin. Therefore, the encoder magnet is fastened to the support pin as a molded encoder magnet component. For example, the molded encoder magnet component can be mounted directly on the support pin to facilitate joining with the rotating component, particularly the shaft. As a result of molding, the magnet can be securely connected to the support pin such that no rotational or axial degree of freedom is expected. This is advantageous for preventing error signals due to magnets detaching from the shaft, which is subject to high accelerations. Further, this can also save on production resources and therefore also on the production costs which would be associated with an adhesive connection otherwise required between the encoder magnet and the shaft.

According to one aspect of the invention, the support pin has an increased diameter in axial direction in portions thereof. In particular, the support pin can be securely pressed into the shaft such that an increase in force is observed when the stop is reached. This makes possible a force-monitored joining of the assembly comprising the encoder magnet and the rotating component or shaft without applying constraint forces to the magnet.

According to one aspect of the invention, the support pin has a diameter which is less than 4 mm, preferably less than 2.5 mm. In this way, impairment of the magnetic properties of the encoder magnet can be prevented.

Alternatively or additionally, the support pin is formed from a ferromagnetic material. The advantage of this construction consists in that the support pin can achieve a connection in a simple manner for process-related reasons. However, the support pin can be further structured for the purpose of improving the positively engaging connection.

According to one aspect of the invention, the actuator comprises the support pin. The support pin is preferably received in a bore hole of the rotating component. Alternatively, the support pin is formed integral with the rotating component. This benefits a connection which is fixed with respect to axial displacement and radial rotation.

According to one aspect of the invention, the molded encoder magnet component is mounted on a sleeve-shaped connection element arranged between the annular encoder magnet and the support pin. Therefore, the encoder magnet is not molded directly on the support pin but rather on the sleeve-shaped connection element. In this way, however, an indirect molding of the encoder magnet on the support pin is carried out in order to enable a connection between the encoder magnet and the support pin which is fixed with respect to axial displacement and radial rotation.

BRIEF DESCRIPTION OF THE DRAWINGS

Aspects of the invention will now be described by way of example and with reference to the appended drawings. The drawings show.

DETAILED DESCRIPTION OF THE PRESENTLY PREFERRED EMBODIMENTS

Figure 1:
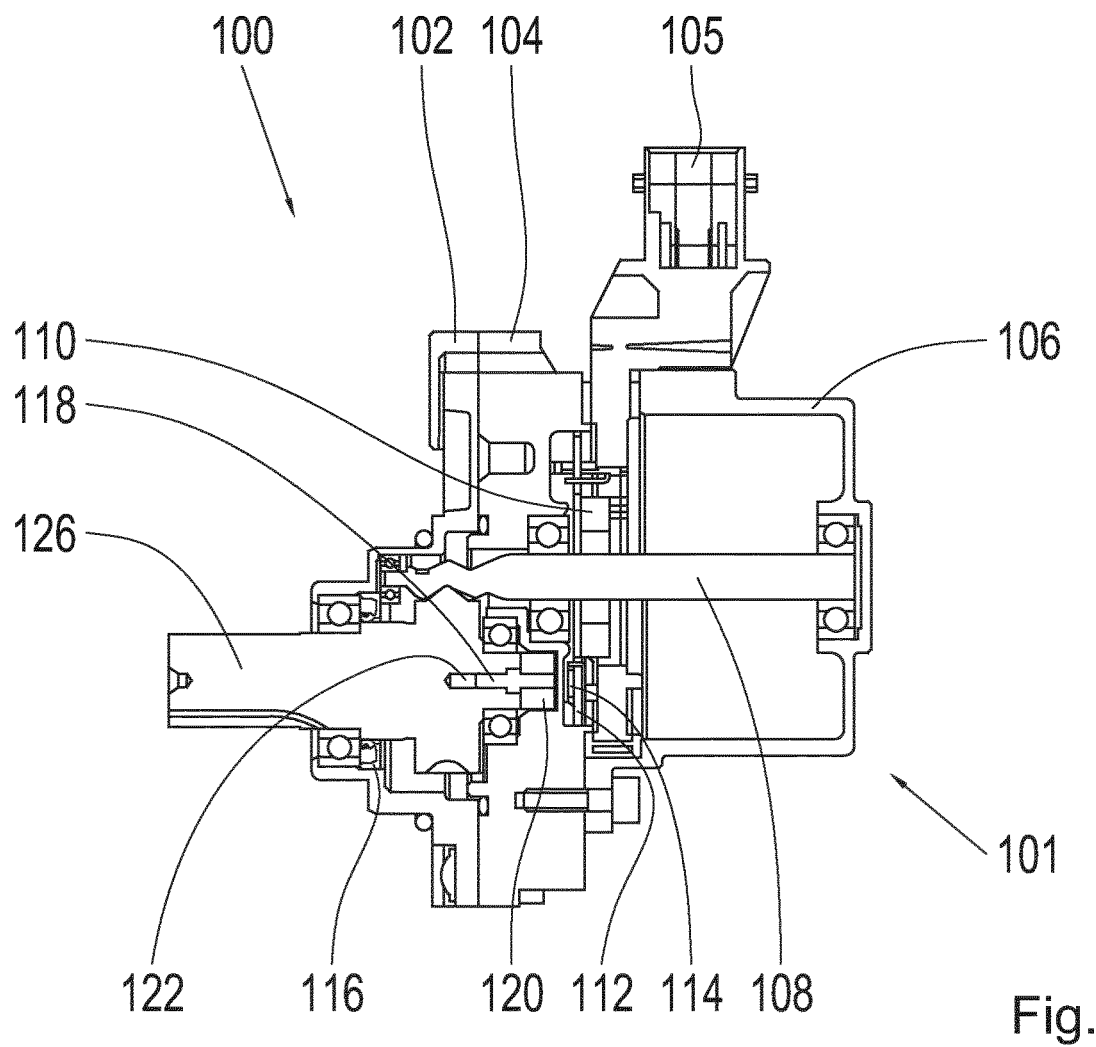
FIG. 1 is a schematic view of an actuator.

FIG. 1 shows a schematic sectional view of an actuator 100 for actuating a movable shift element of a transmission for an electric motor 101. As is shown in this instance, the actuator 100 is preferably formed from an electric motor (BLDC). The electric motor 101 is usable in an electric vehicle, particularly in an electrified utility vehicle, as an axle drive. The electric motor 101 comprises a motor shaft 108 to which a rotor, not shown in more detail, is fastened so as to be fixed with respect to rotation relative to it, and a stator, not shown here in more detail, which is arranged in a motor housing 106. The electric motor 101 additionally comprises a sensor system comprising a first sensor (relative sensor) 124 and a second sensor (absolute sensor) 114. The two sensors 114, 124 are mounted on a printed circuit board 112. A plug connector 105 is likewise provided for feeding power and signals to the two sensors 114, 124. The printed circuit board 112 preferably has a board.

A torque is generated in the electric motor 101 by supplying energy. The torque is stepped up to a higher torque on the output shaft via the motor shaft 108 by a spur gear stage and a gear ratio. An output shaft 126 comprising an output pinion engaging in a toothed rack serves to transmit torque. The toothed rack is connected to a shift fork in order to displace the latter and accordingly shift gears. The output shaft 126 is fastened by a sealing ring 116 in the middle of an actuator flange 102, which is fastened to the motor housing 106 via a motor flange 104.

Figure 2:
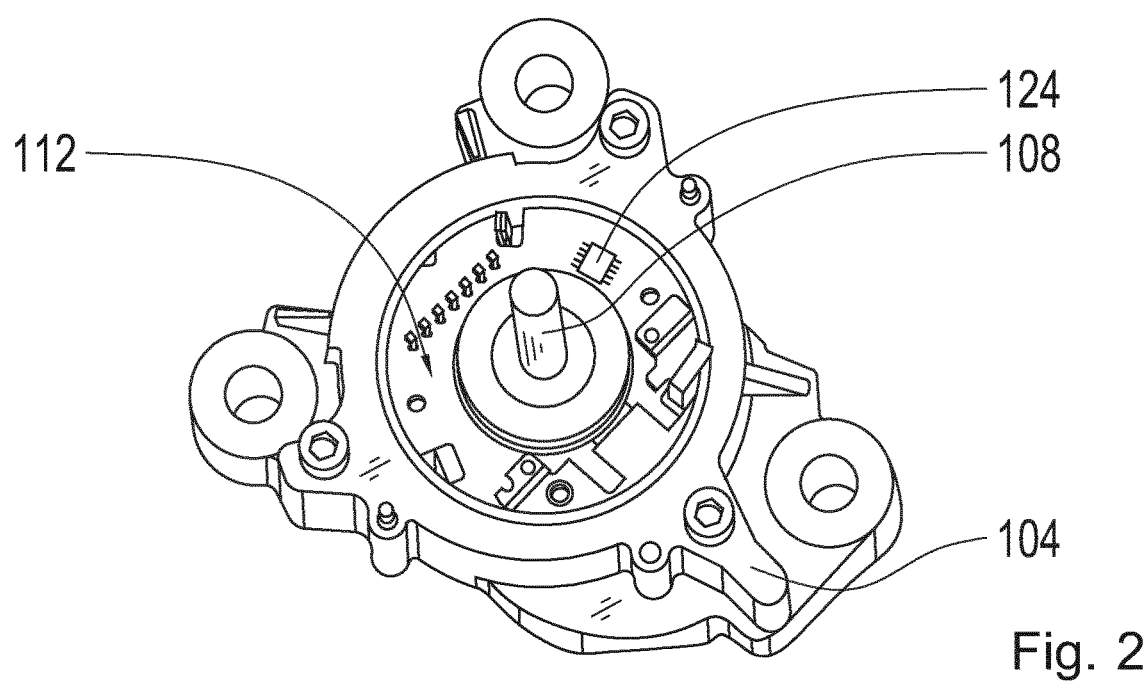
FIG. 2 is a schematic view of a sensor device in the actuator from FIG. 1.

The electric motor 101 is directly controlled by the first sensor (relative sensor) 124 in that the first sensor 124 sends a control signal to a signal conversion unit (e.g., an encoder) via the printed circuit board 112 and the plug connector 105. The signal conversion unit in turn converts the determined speed in the electric motor 101 based on the control signal. The first sensor 12 is operated via a so-called side shaft application by an annular magnet 110. The arrangement of the first sensor 124 on the printed circuit board 112 embedded centrally in the motor flange 104 is shown in more detail in the perspective view in FIG. 2 corresponding to a viewing direction from right to left in FIG. 1.

Figure 3:
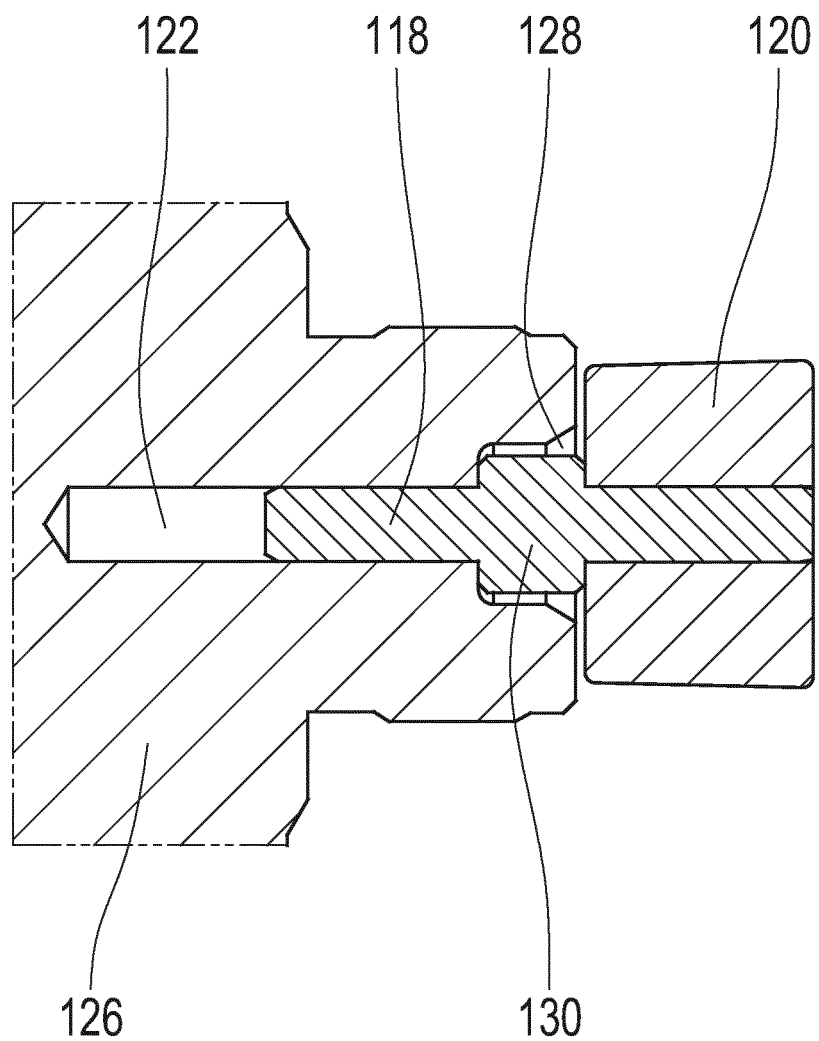
FIG. 3 is a detail of the encoder magnet.

The second sensor (absolute sensor) 114 serves to reproduce the rotational angle of the output shaft 126. An encoder magnet 120 is used to generate magnetic fields and is detected by the second sensor 114. The second sensor 114 can comprise a Hall sensor and/or a magnetoresistive sensor. The encoder magnet 120 is connected to the output shaft 126 so as to be fixed with respect to rotation relative to it. A support pin 118 is provided for this purpose and is inserted in a bore hole 122 of the output shaft 126 and accordingly connected to the latter, preferably by positive engagement and frictional engagement, so as to be fixed with respect to rotation relative to it. The encoder magnet 120 is formed as a molded encoder magnet component and is fastened to the support pin 118 by a molding process. The annularly formed encoder magnet 120 is shown together with the support pin 118 in more detail in the schematic sectional view in FIG. 3. The support pin 118 has a varying diameter in axial direction, preferably a diameter enlargement 130 in certain portions. As is shown in FIG. 3, the diameter enlargement 130 is received, for example, by a front recess 128 of the output shaft 126, preferably in a positive engagement and/or frictional engagement. In this way, a force-monitored joining of the assembly comprising encoder magnet 120 and output shaft 126 can be made possible without applying force to the encoder magnet 120.

Although not shown in the drawings, a sleeve-shaped connection element can be arranged between the annular encoder magnet 120 and the support pin 118. In this case, the encoder magnet 120 is molded directly onto the sleeve-shaped connection element which can be formed from plastic and is accordingly molded indirectly onto the support pin 118. Alternatively or additionally, the support pin 118 can be formed integral with the output shaft 126.

Thus, while there have shown and described and pointed out fundamental novel features of the invention as applied to a preferred embodiment thereof, it will be understood that various 5 omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An actuator configured to actuate a shift element in a transmission of a vehicle, comprising:
   a sensor device configured to detect angular positions of a rotating component, wherein the sensor device comprises:
      a support pin supported on a front side of the rotating component so as to be fixed with respect to rotation relative to it; and
      an annular encoder magnet fastened to the support pin such that the annular encoder magnet at least partially surrounds the support pin,
      wherein the annular encoder magnet is mounted on the support pin as a molded encoder magnet component,
      wherein the support pin has a diameter which is less than 4 mm.

2. The actuator according to claim 1, wherein the support pin has a diameter enlargement in axial direction in portions thereof.

3. The actuator according to claim 1, wherein the support pin has a diameter which is less than 4 mm.

4. The actuator according to claim 1, wherein the actuator comprises the support pin.

5. The actuator according to claim 4, wherein the support pin is received in a bore hole of the rotating component.

6. The actuator according to claim 4, wherein the support pin is formed integral with the rotating component.

7. The actuator according to claim 1, wherein the molded encoder magnet component is mounted on a sleeve-shaped connection element arranged between the annular encoder magnet and the support pin.

8. An electric drive comprising:
   an electric motor; and
   a transmission configured to shift a speed of the electric motor which is arranged in an actuator configured to actuate a shift element of the transmission comprising:
      a sensor device configured to detect angular positions of a rotating component, wherein the sensor device comprises:
         a support pin supported on a front side of the rotating component so as to be fixed with respect to rotation relative to it; and
         an annular encoder magnet fastened to the support pin such that the annular encoder magnet at least partially surrounds the support pin,
         wherein the annular encoder magnet is mounted on the support pin as a molded encoder magnet component,
         wherein the support pin has a diameter which is less than 4 mm.

9. The actuator according to claim 1, wherein the vehicle is a utility vehicle.

10. The actuator according to claim 1, wherein the rotating component is a shaft in an electric drive for the vehicle.

11. The actuator according to claim 1, wherein the diameter is less than 2.5 mm.

* * * * *